United States Patent
Gagnon et al.

(10) Patent No.: US 6,429,433 B1
(45) Date of Patent: Aug. 6, 2002

(54) CONTINUOUS ROTATION SAMPLING SCHEME FOR TRANSMISSION RADIATION CORRECTED GAMMA CAMERAS

(75) Inventors: Daniel Gagnon, Twinsburg; Chi-Hua Tung, Aurora, both of OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/522,737

(22) Filed: Mar. 10, 2000

(51) Int. Cl.⁷ .............................................. G01T 1/166
(52) U.S. Cl. ..................... 250/363.02; 378/11; 378/15; 250/363.01; 250/363.05; 250/363.08; 250/363.1
(58) Field of Search ................ 378/11, 15; 250/363.04, 250/363.01, 363.02, 363.05, 363.08, 363.1

(56) References Cited

U.S. PATENT DOCUMENTS

| | | | | |
|---|---|---|---|---|
| 5,600,145 A | | 2/1997 | Plummer ................... | 250/363.4 |
| 5,625,661 A | * | 4/1997 | Oikawa ....................... | 378/15 |
| 5,638,817 A | | 6/1997 | Morgan et al. ........... | 128/653.1 |
| 5,717,212 A | | 2/1998 | Fulton et al. ............. | 250/363.5 |
| 5,761,333 A | * | 6/1998 | Hsieh et al. ................ | 382/131 |

OTHER PUBLICATIONS

"Design and Performance of a Single Photon Transmission Measurement for the ECAT ART", Watson, et al., CTI Pet Systems, Knoxville, TN.
"Attenuation Correction in PET Using Single Photon Transmission Measurement", DeKemp, et al., Med. Phys. 21 (6), Jun. 1994, pp. 771–778.
"IRIX™ Variable Angle, Triple–Detector Nuclear Imaging System", Picker Advertising Brochure, Jul. 1999.
"BEACON™ Non–Uniform Attenuation Correction" Picker Advertising Brochure, Aug. 1999.
"AXIS™ Variable Angle, Dual–Detector Nuclear Imaging System" Picker Advertising Brochure, Jul. 1999.
"Design and Performance of a single photon transmission measurement for the ecat art," Watson, et al., IEEE MIC Conference Record, pp. 1366–1370, Oct. 1997.

* cited by examiner

Primary Examiner—Constantine Hannaher
Assistant Examiner—Timothy Moran
(74) Attorney, Agent, or Firm—Fay, Sharpe, Fagan, Minnich & McKee, LLP

(57) ABSTRACT

A continuous rotation sampling scheme for use with a nuclear medicine gamma camera facilitates collection of transmission and emission data leading to a reduced overall scan time. The gantry (16) contains a plurality of radiation detector heads (20a–20c) with planar faces and at least one adjustably mounted radiation source (30a). During transmission data collection, the gantry (16) continuously rotates about a subject receiving aperture (18) while the radiation source (30a) continuously rasters back and forth across the field of view. The detected transmission radiation (32a) is reconstructed into an attenuation volumetric image representation by a transmission reconstruction processor (64t). The transmission reconstruction processor (64t) performs a fan beam reconstruction algorithm in each of a multiplicity of planes perpendicular to an axis of rotation. An angular displacement versus radiation source motion index is calculated in order to update the transmission reconstruction for a sampled data line of transmission radiation. Such continuous rotation during transmission data acquisition reduces overall scan time by eliminating the dead time during which the gantry rotates and comes to rest at incremental angular orientations.

23 Claims, 4 Drawing Sheets

CONTINUOUS ROTATION SAMPLING SCHEME FOR TRANSMISSION RADIATION CORRECTED GAMMA CAMERAS

BACKGROUND OF THE INVENTION

The present invention relates to the arts of nuclear medicine and diagnostic imaging. It finds particular application in conjunction with gamma cameras and will be described with particular reference thereto. It is to be appreciated that the present invention is applicable to single photon emission computed tomography (SPECT), positron emission tomography (PET), whole body nuclear scans, and/or other like applications.

Diagnostic nuclear imaging is used to study a radionuclide distribution in a subject. Typically, one or more radiopharmaceuticals or radioisotopes are injected into a subject. The radiopharmaceuticals are commonly injected into the subject's blood stream for imaging the circulatory system or for imaging specific organs which absorb the injected radiopharmaceuticals. Gamma or scintillation camera detector heads, typically including collimators, are placed adjacent to a surface of the subject to monitor and record emitted radiation. For three-dimensional reconstruction, the detector heads are rotated or indexed around the subject to monitor the emitted radiation from a plurality of directions. In SPECT, emission radiation is detected by each collimated detector. In PET, data collection is limited to emission radiation that is detected concurrently by a pair of oppositely disposed heads. The monitored radiation data from the multiplicity of directions is reconstructed into a three dimensional image representation of the radiopharmaceutical distribution within the subject.

One of the problems with these imaging techniques is that photon absorption and scatter by portions of the subject or subject support between the emitting radionuclide and the detector heads distort the resultant image. One solution for compensating for photon attenuation is to assume uniform photon attenuation throughout the subject. That is, the subject is assumed to be completely homogeneous in terms of radiation attenuation with no distinction made for bone, soft tissue, lung, etc. This enables attenuation estimates to be made based on the surface contour of the subject. However, human subjects do not cause uniform radiation attenuation, especially in the chest.

In order to obtain more accurate SPECT and PET radiation attenuation measurements, a direct transmission radiation attenuation measurement is made using transmission computed tomography techniques. More specifically, radiation is projected from a radiation source through the subject. Attenuated radiation rays are received by the detector at the opposite side. The source and detectors are rotated to collect transmission data concurrently or sequentially with the emission data through a multiplicity of angles. This transmission data is reconstructed into an image representation using conventional tomography algorithms. Regional radiation attenuation properties of the subject and the support, which are derived from the transmission computed tomography image, are used to correct or compensate for radiation attenuation in the emission data.

SPECT and PET measurements are typically made at incrementally stepped locations. One difficulty resides in optimizing the sampling of both the SPECT or PET emission data and the transmission data so as to reduce overall scan time. Typically, nuclear camera detector heads are stepped to a plurality of positions around the patient, e.g. 60 positions. At each position, emission and/or transmission radiation data is collected. The total time to perform a transmission scan is composed of the time to actually acquire data at each angular orientation and the time to mechanically rotate the gantry from one angular orientation to another and stabilize it at the new orientation. Typically, these two components are of a similar order of magnitude, e.g. 4–5 seconds for data collection at each angular orientation and approximately 2–4 seconds for gantry rotation to each angular orientation and stabilization. A wait time for stabilization of only 2–4 seconds per step adds 4–8 minutes to a 120 step scan.

The present invention contemplates a new and improved data sampling technique for collecting transmission radiation which overcomes the above-referenced problems and others.

SUMMARY OF THE INVENTION

In accordance with one aspect of the present invention, a method of diagnostic imaging using a nuclear medicine gamma camera includes placing a subject in a subject receiving aperture and injecting the subject with a radiopharmaceutical. At least one radiation source and a plurality of radiation detectors are positioned about the subject receiving aperture such that the radiation source is across the subject receiving aperture from a corresponding radiation detector. Radiation from the radiation source is transmitted toward the corresponding radiation detector which is positioned across the subject receiving aperture. The at least one radiation source and radiation detectors are continuously rotated together about the subject receiving aperture. Radiation transmitted by the radiation source is detected using one of the plurality of radiation detectors and reconstructed into an attenuation volume image representation. Radiation emitted by the injected radiopharmaceutical is detected using the plurality of radiation detectors and reconstructed into an image representation.

In accordance with another aspect of the present invention, a nuclear medicine gamma camera for diagnostic imaging includes a rotating gantry which defines a subject receiving aperture. A plurality of radiation detectors are movably attached to the rotating gantry such that the detector heads rotate about the subject receiving aperture with rotation of the rotating gantry about an axis of rotation. At least one radiation source is mounted to at least one detector head for rotation therewith such that transmission radiation from the radiation source is directed toward and received by a corresponding detector head positioned across the subject receiving aperture from the radiation source. The radiation source is rastered back and forth in a direction parallel to that of the axis of rotation. A raster sensor detects rastering of the radiation source across a field of view and a gantry sensor detects gantry rotation about the subject receiving aperture. A reconstruction processor reconstructs a volumetric emission image representation from the detected emission and transmission data, the sensed rastering of the radiation source, and the sensed gantry rotation.

In accordance with another aspect of the present invention, a method of generating emission radiation images includes concurrently (1) continuously rotating a radiation source around an axis of rotation and (2) rastering a radiation source back and forth parallel to the axis of rotation. Radiation transmitted from the radiation source and radiation emitted by radioisotopes disposed in a volume of interest adjacent the axis of rotation are detected in at least one detection plane which is parallel to and displaced from the axis of rotation. The at least one detection plane is rotated concurrently with the radiation source. The rastering of the radiation source is sensed as the transmitted radiation is detected and the rotation of the radiation source and the at least one detection plane are sensed as the transmitted and emitted radiation are detected. The detected transmission radiation is reconstructed into a transmission volume image representation. Detected emission radiation is weighted with the transmission image representation and the weighted emission radiation is then reconstructed into a volumetric emission radiation image representation.

One advantage of the present invention is that it reduces gantry dead time.

Another advantage of the present invention is that it reduces overall transmission scan time by approximately 50%.

Another advantage of the present invention is that it provides greater resolution for SPECT emission data than is required for transmission data.

Other benefits and advantages of the present invention will become apparent to those skilled in the art upon a reading and understanding of the preferred embodiment.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
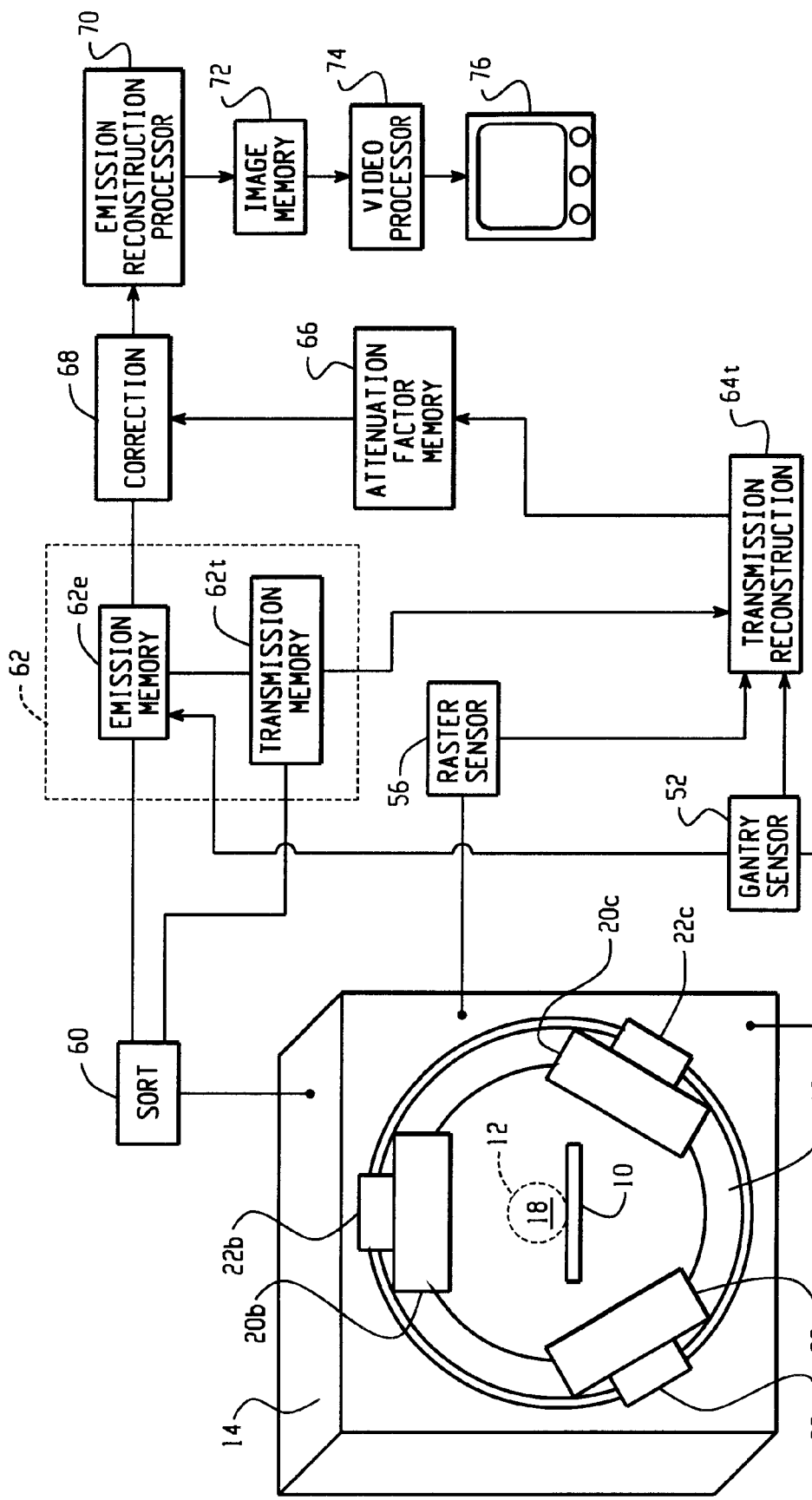
FIG. 1 is a diagrammatic illustration of a nuclear medicine gamma camera in accordance with aspects of the present invention.

With reference to FIG. 1, a diagnostic imaging apparatus includes a subject support 10, such as a table or couch, which supports a subject 12 being examined or imaged. The subject 12 is injected with one or more radiopharmaceuticals or radioisotopes such that emission radiation is emitted therefrom. Optionally, the subject support 10 is selectively height adjustable so as to center the subject 12 at a desired height, e.g., the volume of interest is centered. A first or stationary gantry 14 rotatably supports a rotating gantry 16. The rotating gantry 16 defines a subject receiving aperture 18. In a preferred embodiment, the first gantry 14 is moved longitudinally along the subject support 10 so as to selectively position regions of interest of the subject 12 within the subject receiving aperture 18. Alternately, the subject support 10 is advanced and retracted to achieve the desired positioning of the subject 12 within the subject receiving aperture 18.

Detector heads 20a, 20b, 20c are individually positionable on the rotating gantry 16. The detector heads 20a–20c also rotate as a group about the subject receiving aperture 18 (and the subject 12 when received) with the rotation of the rotating gantry 16. The detector heads 20a–20c are radially and circumferentially adjustable to vary their distance from the subject and spacing on the rotating gantry 16, as for example, in the manner disclosed in U.S. Pat. No. 5,717,212. Separate translation devices 22a, 22b, 22c, such as motors and drive assemblies, independently translate the detector heads radially and laterally in directions tangential to the subject receiving aperture 18 along linear tracks or other appropriate guides.

Each of the detector heads 20a–20c has a radiation receiving face facing the subject receiving aperture 18. Each head includes a scintillation crystal, such as a large doped sodium iodide crystal, that emits a flash of light or photons in response to incident radiation. An array of photomultiplier tubes receive the light flashes and convert them into electrical signals. A resolver circuit resolves the x, y-coordinates of each flash of light and the energy of the incident radiation. That is to say, radiation strikes the scintillation crystal causing the scintillation crystal to scintillate, i.e., emit light photons in response to the radiation. The photons are received by the photomultiplier tubes and the relative outputs of the photomultiplier tubes are processed and corrected to generate an output signal indicative of (i) a position coordinate on the detector head at which each radiation event is received, and (ii) an energy of each event. The energy is used to differentiate between various types of radiation such as multiple emission radiation sources, stray and secondary emission radiation, scattered radiation, transmission radiation, and to eliminate noise. In SPECT imaging, a projection image representation is defined by the radiation data received at each coordinate on the detector head. In PET imaging, the detector head outputs are monitored for coincident radiation. From the position and orientation of the heads and the location on the faces at which the coincident radiation was received, a ray between the peak detection points is calculated. This ray defines a line along which the radiation event occurred. The radiation data from a multiplicity of angular orientations of the heads is then reconstructed into a volumetric image representation of the region of interest.

For SPECT imaging, the detector heads 20a–20c include mechanical collimators 24a, 24b, 24c, respectively, removably mounted on the radiation receiving faces of the detector heads 20a–20c. The collimators include an array or grid of lead vanes which restrict the detector heads 20a–20c from receiving radiation not traveling along selected rays in accordance with the selected imaging procedure. For PET imaging, a SPECT camera without collimators on the detector heads may be employed. Alternately, PET imaging is performed using collimators to eliminate stray radiation.

Figure 2:
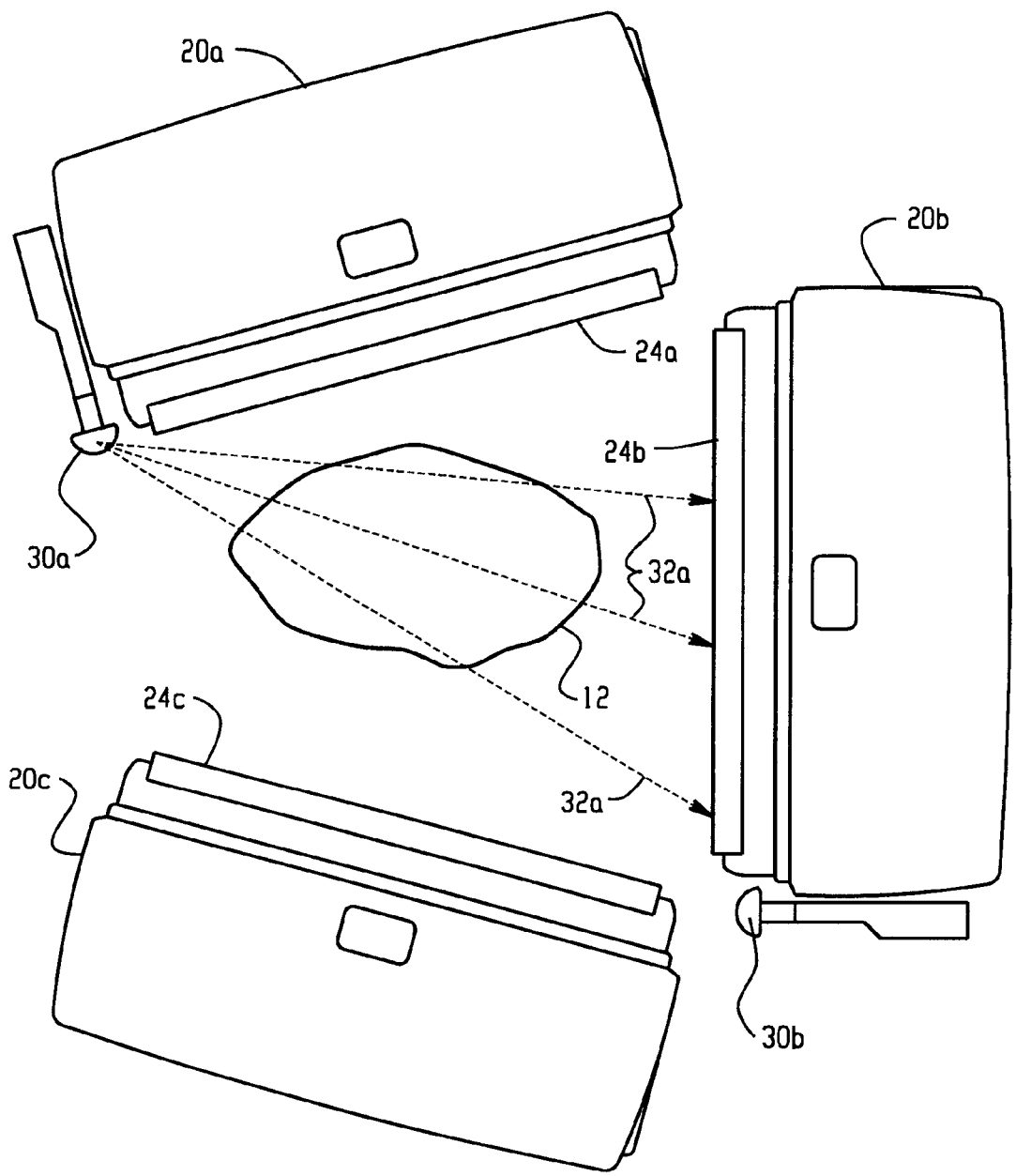
FIG. 2 is a diagrammatic illustration of a preferred orientation of heads in a three head nuclear medicine gamma camera for SPECT imaging in accordance with the present invention.
Figure 3:
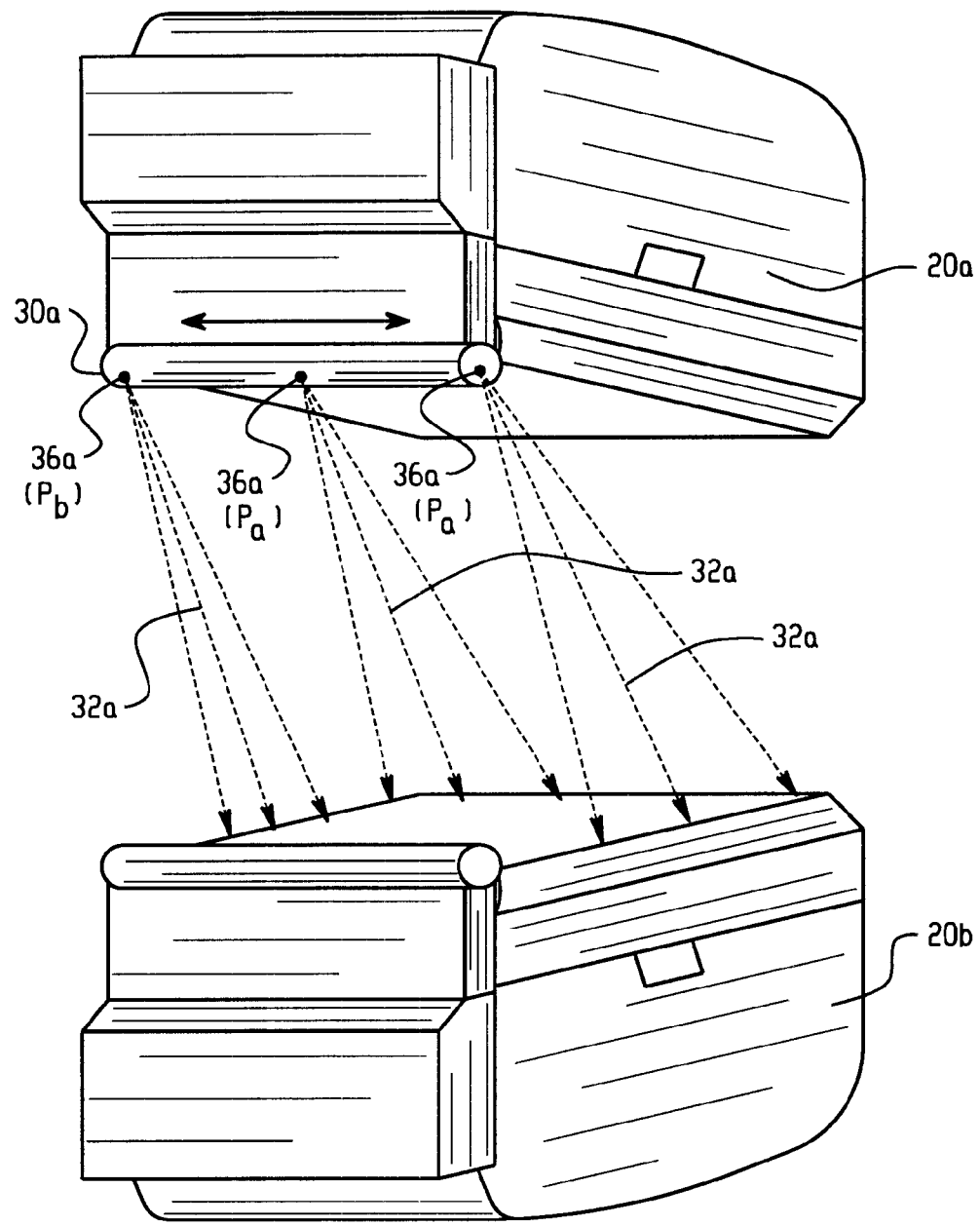
FIG. 3 is a perspective view of a preferred orientation of two heads of a nuclear medicine gamma camera for SPECT or PET in accordance with the present invention.

With reference to FIG. 2 and FIG. 3 and continuing reference to FIG. 1, at least one radiation source 30a is mounted to at least one detector head 20a such that transmission radiation (represented by the arrows 32a) from the radiation source 30a is directed toward and received by the corresponding detector head 20b positioned across the subject receiving aperture from the radiation source 30a. It is to be appreciated that radiation sources may be mounted to two or all three detector heads. In a preferred embodiment, a collimator is employed at least on the detector head 20b which receives the transmission radiation 32a. That is to say, the collimator 24b restricts the detector head 20b, (in the embodiment of FIG. 2) from receiving those portions of transmission radiation not traveling along direct rays from the source to the radiation receiving face of the detector head. Alternately, other collimation geometries are employed for different applications and radiation sources, such as a line source. Additional collimation may take place at the source.

FIG. 2 illustrates a three-head embodiment, including a first detector head 20a, a second detector head 20b, and a third detector head 20c arranged on the rotating gantry 16 spaced from one another around the subject receiving aperture 18. A first radiation source 30a is mounted to the first detector head 20a such that transmission radiation 32a therefrom is directed toward and received by the second detector head 20b. A second radiation source 30b is optionally mounted to the second detector head 20b such that transmission radiation therefrom can be directed toward and received by the first detector head 20a.

In one embodiment, the radiation source 30a contains a radioactive point source 36a adjustably mounted inside a shielded steel cylinder which is sealed at the ends. As shown in FIG. 3, the radiation source 30a rasters longitudinally across the field of view as the gantry rotates through a plurality of angular orientations about the subject receiving aperture. The steel cylinder is adjustably mounted onto the corresponding detector head through a pivoting arm mechanism. Alternately, the radiation source 30a is a bar source, flat rectangular source, disk source, flood source, tube or vessel filled with radionuclides, or active radiation generators such as x-ray tubes.

With reference again to FIG. 1, as the gantry 16 continuously rotates about the subject receiving aperture 18 during the collection of transmission data, a gantry rotation sensor 52 senses or indexes the gantry rotation, and therefore the location of the detector heads 20a–20c and the radiation source 30a at each data sampling. In one embodiment, the gantry rotation sensor is an optical sensor which senses the position of the gantry versus time by projecting light, such as a laser beam, through a graticulated ring on the gantry and receiving the projected light. It is to be appreciated that conventional mechanical means, such as rotating gears, are also employed for detecting angular orientation of the gantry. A raster sensor 56 senses or indexes the location or speed of the point source 36a within the radiation source 30a as it continuously rasters back and forth across the field of view during the continuous rotation of the gantry 16. As will be described more fully below, data from the gantry sensor 52 and the raster sensor 56 are used to reconstruct the transmission data from the gantry sensor 56 and detector head. Radial and any circumferential offset information are used to reconstruct the emission data.

Running an imaging operation includes a reconstruction process for emission and transmission data. The reconstruction process changes according to the type of radiation collected and the types of collimators used (i.e., fan, cone, parallel beam, and/or other modes). Emission radiation from the subject 12 is received by detector heads 20a–20c and transmission radiation 32a from the radiation source 30a is received by the detector head 20b to generate emission projection data and transmission projection data. The emission data normally contains inaccuracies caused by varying absorption characteristics of the subject's anatomy. A sorter 60 sorts the emission projection data and transmission projection data, such as on the basis of their relative energies or the detector head which originated the data. The data is stored in a projection view memory 62, more specifically in a corresponding emission data memory 62e and transmission data memory 62t. A reconstruction processor 64t uses a fan beam reconstruction algorithm to reconstruct the transmission data into a transmission image representation or volume of attenuation factors stored in a memory 66. Each voxel value stored in the memory 66 is indicative of attenuation of tissue in a corresponding location within the subject 12.

An emission data correction processor 68 corrects each emission data in accordance with the attenuation factors determined from the transmission data. More specifically, for each ray along which emission data is received, the emission correction processor 68 calculates a corresponding ray through the transmission attenuation factors stored in the memory 66. Each ray of the emission data is then weighted or corrected by the emission data correction processor 68 in accordance with the attenuation factors. The corrected emission data are reconstructed by an emission radiation reconstruction processor 70 to generate a three-dimensional emission image representation that is stored in a volumetric emission image memory 72. A video processor 74 withdraws selected portions of the data from the image memory 72 to generate corresponding human-readable displays on a video monitor 76. Typical displays include reprojections, selected slices or planes, surface renderings, and the like.

Figure 4:
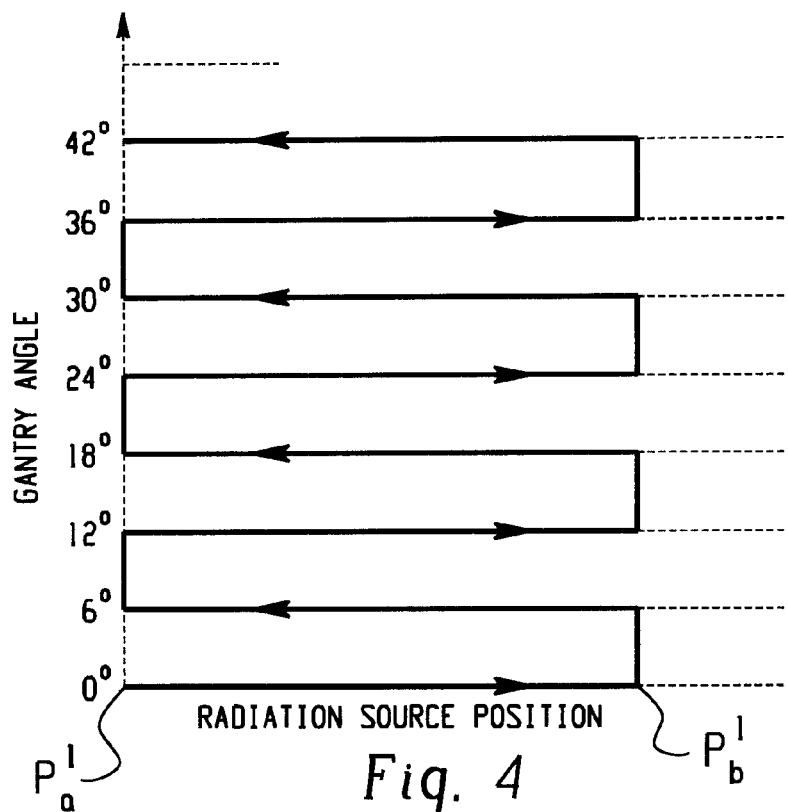
FIG. 4 is a plot of gantry angle versus radiation source position in accordance with a step-and-shoot sampling technique of the prior art; and, FIG. 5 is a plot of gantry angle versus radiation source position in accordance with the continuous rotation sampling technique of the present invention.
Figure 5:
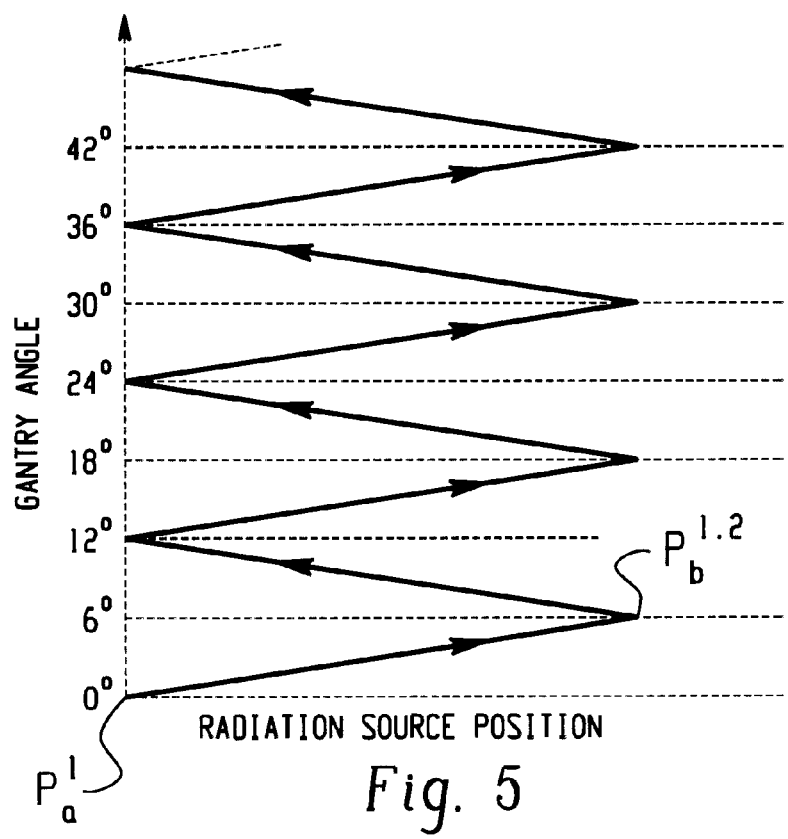

With reference to FIG. 4 and FIG. 5 and continuing reference to FIG. 1, a continuous rotation sampling scheme is utilized to acquire transmission data. As illustrated in FIG. 5, during a transmission scan, the point source continuously rasters back and forth across the field of view (from $P_a$ to $P_b$ and vice versa) while the gantry continuously rotates through a plurality of angular orientations to acquire transmission data. For example, rather than rotating and stabilizing the gantry at a 0° orientation, then rastering the point source from $P_a^1$ to $P_b^1$, and then rotating the gantry to a 6° angular orientation (as illustrated in prior art FIG. 4), the gantry rotates continuously from 0° through 6° while the radiation point source rasters from $P_a^1$ to $P_b^{1,2}$. Collecting transmission data during continuous rotation of the gantry facilitates sequential collection of a complete set of emission and transmission data in a greatly reduced time (as opposed to the step-and-shoot prior art method illustrated in FIG. 4).

Those skilled in the art will appreciate that continuous rotation and translation of the point source causes the apex of the transmission radiation fans to traverse a twisted path. In other words, each transmission projection is no longer a common horizontal line on a plot of gantry angle versus radiation source position and $P_b^1$ and $P_b^2$ completely overlap, illustrated as $P_b^{1,2}$ in FIG. 5. In this embodiment, the transmission data is handled as a series of slices, each slice being defined by a plurality of radiation fans with known apices, each offset by a small angle from the preceding slice.

In order to account for the continuous rotation of the gantry during transmission data acquisition, the transmission reconstruction processor 64t uses a fan beam reconstruction algorithm which is indexed for the actual apex position of each sampled data line. It is to be appreciated that other conventional reconstruction algorithms may be employed. Proper indexing of the continuously changing camera geometry includes calculating an angular displacement versus radiation source motion index. This index relates the rate of gantry rotation to the rastering speed of the point source for any given element of a transmission projection. The gantry rotation sensor 52 senses the angular position of the gantry, and therefore the point source about the subject receiving aperture, while the raster speed sensor 56 senses the rastering position or speed of the point source. A simple division of gantry rotation speed (degree/second) by point source rastering speed (cm/second) can supply an angular displacement versus radiation source motion index (degree/cm) for use in the reconstruction algorithm. Preferably, the motion index is converted into units of gantry rotation (in degrees) per unit of radiation source motion (in terms of a radiation detector face pixel). Therefore, the transmission reconstruction processor 64t updates the geometry of the gamma camera on a pixel-by-pixel basis.

The effective resolution of the emission data is selected with the rotational speed of the rotating gantry. In the embodiment of FIG. 5, the effective transmission data resolution in the center plane is 6° and at the edge planes is 12°. However, the more significant portions of the image are normally near the center. In another embodiment, two radiation sources are employed for transmission scanning with the angular sampling of the first source/detector combination overlapping the angular sampling of the second source/detector combination. In this embodiment, the apex of the transmission radiation fan from the first source/detector combination is forced between the apex from the second source/detector combination such that the transmission data resolution is 6° at the edge planes, as in the center plane, resulting in better overall angular sampling. The resolution of the transmission data is adjustable by selecting the point source speed relative to the gantry rotation speed. The point source of radiation is preferably slow enough that a statistically meaningful amount of radiation is sampled in each plane, but fast enough that radiation fan apex orientation blurring is minimized.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A method of diagnostic imaging using a nuclear medicine gamma camera, the method including:
    (a) placing a subject in a subject receiving aperture;
    (b) injecting the subject with a radiopharmaceutical;
    (c) positioning at least one point isotope radiation source and a plurality of radiation detectors about the subject receiving aperture, said point isotope radiation source being mounted to a side portion of a first radiation detector across the subject receiving aperture from a corresponding radiation detector;
    (d) continuously rastering the point isotope radiation source back and forth along the side portion of the first radiation detector, said point isotope radiation source transmitting radiation toward the corresponding radiation detector positioned across the subject receiving aperture;
    (e) continuously rotating the at least one continuously rastering point isotope radiation source and radiation detectors together about the subject receiving aperture;
    (f) detecting radiation transmitted by the continuously rotating and rastering point isotope radiation source using one of the plurality of radiation detectors;
    (g) reconstructing the detected transmission radiation into an attenuation volume image representation;
    (h) detecting radiation emitted by the injected radiopharmaceutical using the plurality of radiation detectors; and
    (i) reconstructing the detected emission radiation into an image representation.

2. The method according to claim 1, wherein step (f) includes:
    indexing a geometry of the nuclear medicine gamma camera on a pixel-by-pixel basis.

3. The method according to claim 2, wherein the indexing step includes:
    sensing the speed at which the point isotope radiation source rasters back and forth along the side portion of the detector head to which it is mounted; and
    sensing the rate at which the point isotope radiation source and radiation detectors rotate about the subject receiving aperture.

4. A method of diagnostic imaging using a nuclear medicine gamma camera, the method including:
    (a) injecting a subject with a radiopharmaceutical, said subject being disposed within a subject receiving aperture;
    (b) continuously rastering a radiation source back and forth along a side portion of a first radiation detector, said radiation source transmitting radiation from the radiation source toward a corresponding radiation detector positioned across the subject receiving aperture;
    (c) continuously rotating the at least one continuously rastering radiation source and radiation detectors together about the subject receiving aperture;
    (d) detecting radiation transmitted by the continuously mastering and rotating radiation source using the corresponding radiation detectors;
    (e) sensing a speed at which the radiation source rasters back and forth;
    (f) sensing a rotation rate at which the radiation source and radiation detectors rotate about the subject receiving aperture;
    (g) from steps (e) and (f), calculating a ratio of gantry rotation rate versus radiation source raster speed;
    (h) using the calculated ratio, reconstructing the detected transmission radiation into an attenuation volume image representation;
    (i) detecting radiation emitted by the injected radiopharmaceutical using the plurality of radiation detectors; and
    (j) reconstructing the detected emission radiation into an image representation.

5. The method according to claim 4, wherein step (j) includes:
    correcting emission radiation data using the attenuation image representation.

6. The method according to claim 5, wherein the correcting step includes:
    calculating attenuation factors from the attenuation image representation, said attenuation factors corresponding to each ray along which emission data is received.

7. A nuclear medicine gamma camera for diagnostic imaging, said gamma camera comprising:
    a rotating gantry which defines a subject receiving aperture, the rotating gantry rotating about the subject receiving aperture about an axis of rotation;
    at least one radiation source mounted to the rotating gantry for rotation therewith, the radiation source being rastered back and forth in a direction parallel to the axis of rotation;
    a raster sensor which detects rastering of the radiation source across a field of view;
    a gantry sensor which detects gantry rotation about the subject receiving aperture;

a plurality of detector heads mounted to the rotating gantry for rotation therewith, the detector heads receiving emission radiation from the subject and generating emission data, a one of the detector heads being mounted to the gantry opposite to the rastering radiation source to receive transmission radiation and generating transmission data concurrently with the generated emission data; and a reconstruction processor which reconstructs a volumetric emission image representation from the detected emission and transmission data, the sensed rastering of the radiation source, and the sensed gantry rotation.

8. The nuclear medicine gamma camera according to claim 7, wherein the reconstruction processor comprises:

a transmission reconstruction processor which reconstructs detected transmission radiation into an attenuation image representation; and an emission reconstruction processor which reconstructs emission data into a diagnostic image representation.

9. The nuclear medicine gamma camera according to claim 7, wherein the at least one radiation source is a point isotope radiation source.

10. The nuclear medicine gamma camera according to claim 9, wherein the point isotope radiation source is mounted to and rasters back and forth along a side portion of one of the plurality of radiation detectors.

11. A nuclear medicine gamma camera for diagnostic imaging, said gamma camera comprising:

a continuously rotating gantry which defines a subject receiving aperture;

a plurality of radiation detector heads attached to the rotating gantry for rotation therewith, said detector heads rotating about the subject receiving aperture with rotation of the rotating gantry about an axis of rotation and generating at least emission data;

at least one radiation source which rasters back and forth in a direction parallel to the axis of rotation, the radiation source being mounted to the rotating gantry displaced from radiation receiving faces of the detector heads for rotation with the gantry such that transmission radiation from the rastering radiation source is directed toward and received by an opposing detector head positioned across the subject receiving aperture from the radiation source to generate transmission as well as emission data;

a raster sensor which detects rastering of the radiation source across a field of view;

a gantry rotation sensor which detects gantry rotation about the subject receiving aperture;

a transmission reconstruction processor for generating a volumetric transmission image representation from the transmission data, the transmission reconstruction processor including an indexer for updating a geometry of a relative location of the radiation source to the reconstructed transmission image representation on a pixel-by-pixel basis, the indexer being connected with the raster sensor and the gantry rotation sensor; and an emission reconstruction processor which reconstructs a volumetric emission image representation from the detected emission data, the sensed gantry rotation, and the volumetric transmission image representation.

12. The nuclear medicine gamma camera according to claim 11, wherein the indexer calculates an angular displacement versus radiation source motion index.

13. The nuclear medicine gamma camera according to claim 12, wherein the gamma camera further comprises:

a correction processor which corrects emission data based on collected and reconstructed transmission data, said correction processor accounting for attenuation effects in the transmission data.

14. A method of generating emission radiation images, said method including:

(a) concurrently (1) continuously rotating a radiation source around an axis of rotation and (2) rastering a radiation source back and forth parallel to the axis of rotation;

(b) detecting radiation transmitted from the radiation source and radiation emitted by radioisotopes disposed in a volume of interest adjacent the axis of rotation in at least one detection plane which is parallel to and displaced from the axis of rotation;

(c) rotating the at least one detection plane concurrently with the radiation source;

(d) sensing the rastering of the radiation source as the transmitted radiation is detected;

(e) sensing the rotation of the radiation source and the at least one detection plane as the transmitted and emitted radiation are detected;

(f) reconstructing the detected transmission radiation into a transmission volume image representation;

(g) weighting detected emission radiation with the transmission image representation; and, (h) reconstructing the weighted emission radiation into a volumetric emission radiation image representation.

15. The method according to claim 14, wherein the reconstructing step includes:

compensating the detected transmission radiation to account for changes in gantry rotation and radiation source translation across the field of view.

16. The method according to claim 15, wherein the compensating includes:

calculating an angular displacement versus radiation source motion index.

17. The method according to claim 15, wherein the compensating is performed on a pixel-by-pixel basis.

18. The method according to claim 14, said method further comprising:

concurrently (1) continuously rotating a second radiation source around the axis of rotation and (2) rastering the second radiation source back and forth parallel to the axis of rotation;

detecting radiation transmitted by the second radiation source in a volume of interest adjacent the axis of rotation in a second detection plane which is circumferentially displaced from the at least one detection plane; and, rotating the second detection plane concurrently with the second radiation source.

19. The method according to claim 18, wherein the first radiation source and detection plane and the second radiation source and detection plane are rotated such that their respective angular samplings overlap.

20. The method as set forth in claim 14, wherein the rastering radiation source is an isotope radiation source.

21. The method as set forth in claim 20, wherein the isotope radiation source is a point source.

22. The method as set forth in claim 21, wherein step (a) includes:

continuously rastering the point source back and forth along a side portion of the at least one detection plane.

23. The method as set forth in claim 14, wherein the at least one detection plane includes a scintillation crystal having a saturation threshold.

* * * * *